United States Patent [19]

Fothergill

[11] 4,195,360
[45] Mar. 25, 1980

[54] SIGNAL PROCESSING CIRCUIT

[75] Inventor: Noel O. Fothergill, Ottawa, Canada

[73] Assignee: Her Majesty the Queen in right of Canada, as represented by the Minister of National Defence, Canada

[21] Appl. No.: 408,969

[22] Filed: Oct. 16, 1973

[51] Int. Cl.² ............................................. H04B 1/12
[52] U.S. Cl. .................................. 367/136; 367/901; 455/305
[58] Field of Search ............ 340/3 R, 5 R, 6 R, 16 R; 325/476

[56] References Cited

U.S. PATENT DOCUMENTS 3,854,117  12/1974  Fothergill .......................... 340/16 R Primary Examiner—Richard A. Farley
Attorney, Agent, or Firm—R. S. Sciascia; Sol Sheinbein

[57] ABSTRACT

In sound target detection equipment, at least three microphones are used in a broadside array manner to ascertain the presence of a selected sound source. The outputs of the three microphones all include the sought signal S and respectively contain noise components X, U and Y. These outputs are combined to provide X-U and X-Y. These two signals are then applied as separate inputs to a discriminator which applies the rules:
(a) when the input signals are both of the same polarity, the discriminator selects the input closer to zero and presents it as the output;
(b) when the input signals are of opposite polarity, the device presents zero as the output.

The output from the discriminator is then subtracted from one of the original microphone outputs in a manner tending to cancel out the noise contents, and the resulting signal examined for the presence of the sought signal S. The invention is applicable also to non-aural signal detection equipment.

12 Claims, 14 Drawing Figures

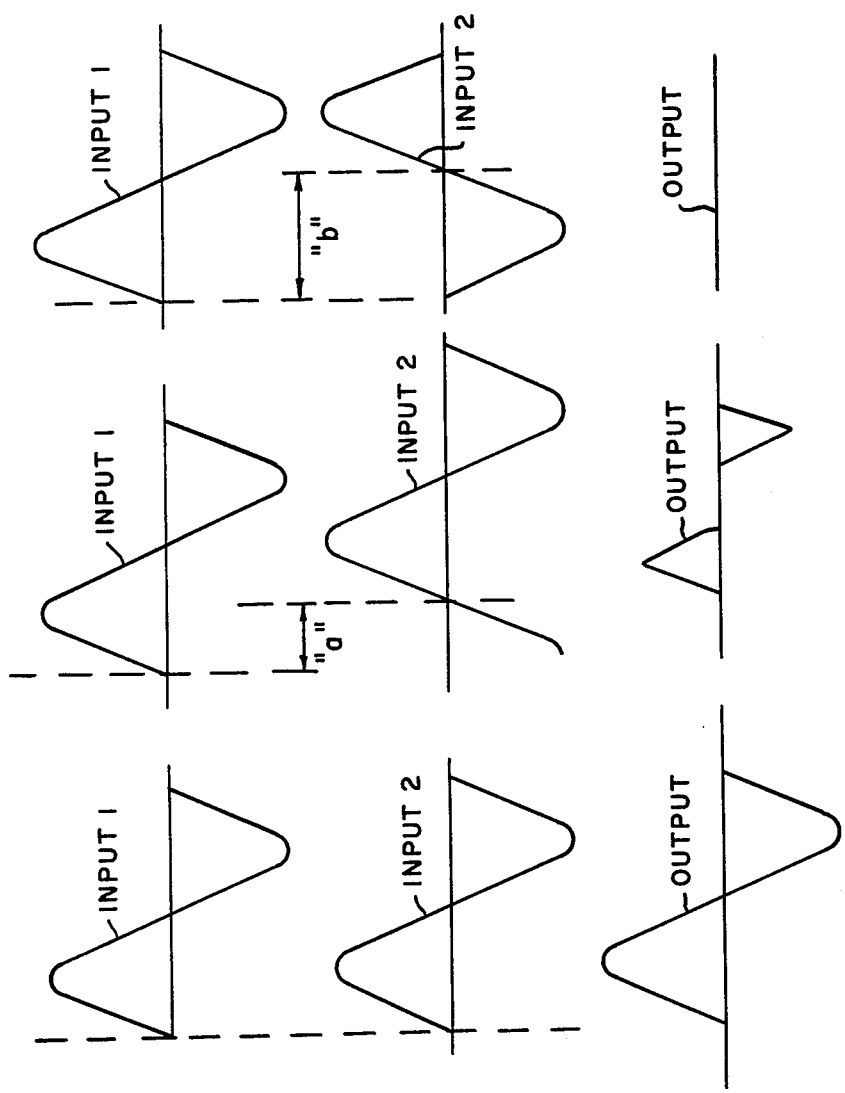

SIGNAL PROCESSING CIRCUIT

BACKGROUND OF THE INVENTION

This invention relates to the detection of relatively weak signals against a background of noise, and typical uses are in the acoustic detection of aircraft, submarines, and land vehicles.

The invention is the subject of my currently copending Canadian application Ser. No. 115,983, filed June 18, 1971.

Two problems are involved in target detection, firstly the actual detection of the presence of a target, and secondly the location or direction-finding of that target. These two requirements are contradictory, since a narrow beam or sector of maximum sensitivity, which is desirable for direction-finding, leads to lack of sensitivity in neighboring directions. Thus an acoustic detection system using a narrow beam requires constant scanning by that beam, at a suitably low speed for detection to take place, if detection (as distinct from direction-finding) is important.

The present invention is directed to detection, rather than direction-finding, of a target.

Another of my copending Canadian patent applications No. 115,982, filed on June 18, 1971 describes a direction-finding system utilizing two microphones and a phase-difference detector which receives the outputs from the two microphones and combines those two outputs in a particular manner in a discriminator which enables the system to be used as a highly-directional device for direction-finding. It also describes an arrangement in which a greater number of pairs of microphones are combined in a similar manner. Such an arrangement provides a compact microphone system for a given narrowness of the beam produced.

It is possible to provide a beam of the same narrowness merely by using a sufficiently large array of microphones with their outputs combined in an additive manner, and for that given beam, the ability to detect a weak signal against background noise is better with the additive arrangement than with the more compact arrangement using discriminators.

An object of the present invention is to improve the detection of weak signals against a background of noise for any given number of signal-receiving transducers.

SUMMARY OF THE INVENTION

According to the present invention, a signal processing circuit particularly adapted for use in the detection of a selected signal against background noise, comprises separate inputs which comprise at least first, second and third inputs which provide respectively the selected signal plus a first noise signal, the selected signal plus a second noise signal, and the selected signal plus a third noise signal (the three noise signals being uncorrelated); first combining means arranged to produce from the first and second inputs a fourth signal from which the selected signal has been eliminated and which comprises the difference between the first and second noise signals; second combining means arranged to produce from the second and third inputs a fifth signal from which the selected signal has been eliminated and which comprises the difference between the second and third noise signals; means arranged to compare the fourth and fifth signals, to select the signal which has an instantaneous value closer to zero, and to present that signal as an instantaneous intermediate output; means arranged to compare the fourth and fifth signals, and when the two signals are of opposite polarity, to present zero as the said instantaneous intermediate output; and combining means by which one of the said inputs is combined with the said intermediate output in a manner tending to eliminate the noise component therein; said intermediate signal containing the selected signal with a higher signal-to-noise ratio than any of the incoming signals.

BRIEF DESCRIPTION OF THE DRAWINGS

The invention will now be described, by way of example, with reference to the accompanying largely diagrammatic drawings, in which:

FIGS. 2, 3 and 4 are graphical representations of two input signals and an output signal of a discriminator shown in FIG. 1;

DETAILED DESCRIPTION

Figure 1:
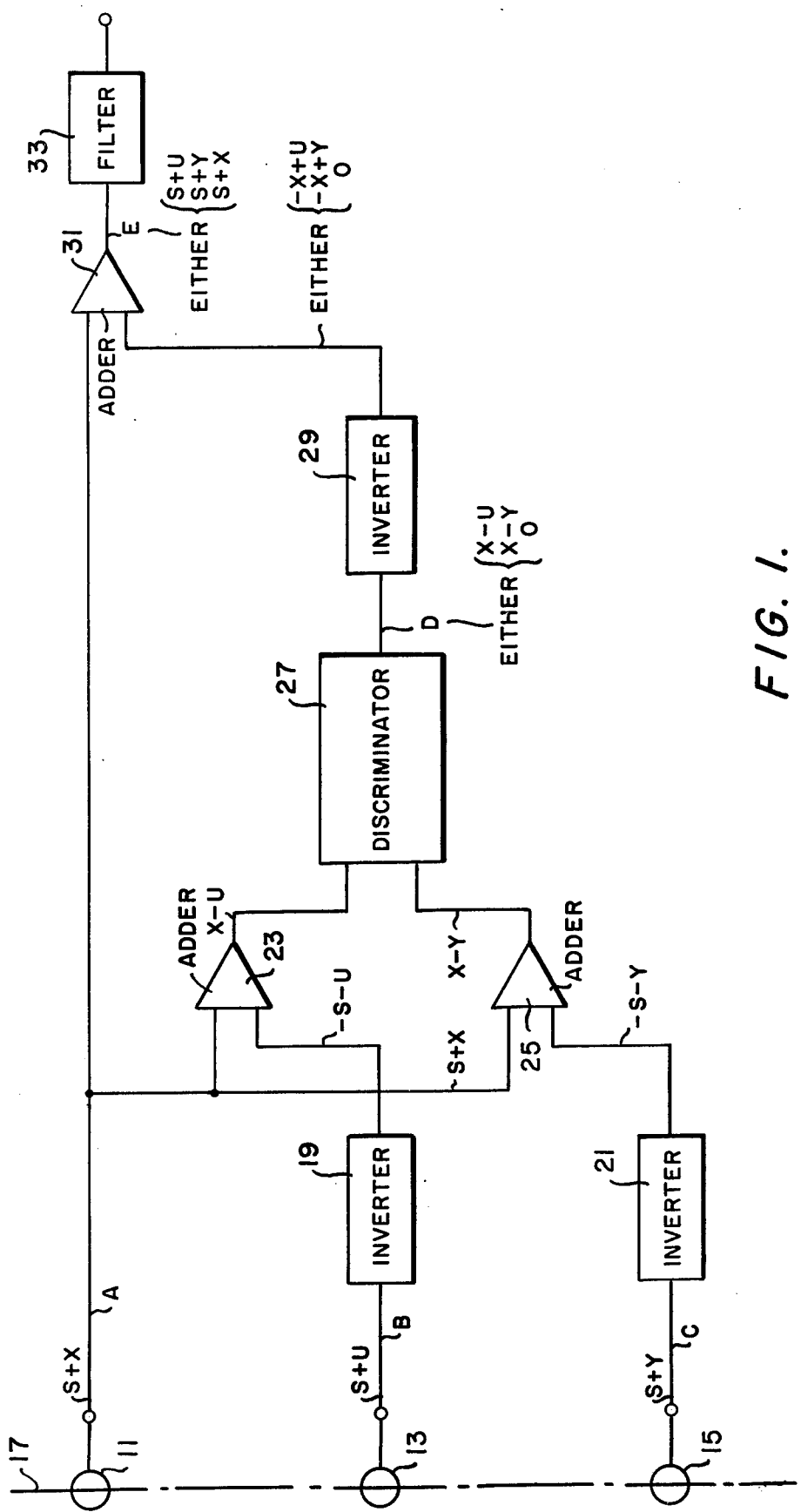
FIG. 1 is a block diagram of a three-input, signal-processing circuit utilized in an aural target detection system.

Referring first to FIG. 1, three microphones 11, 13, and 15 are equally spaced along a straight line 17, and each of these is sensitive to sound approaching the microphone from the left in FIG. 1.

Considering the sound received by the microphones from a single sound source, typically two or three miles from the microphones, each microphone will receive a common signal S and a noise signal which will be different for each microphone, and will be designated by X, U and Y, respectively, for the three microphones. Thus the three outputs from the microphones will be referred to as follows:

| | |
|---|---|
| From microphone 11 | Output is S + X |
| From microphone 13 | Output is S + U |
| From microphone 15 | Output is S + Y |

It is important to realize that in the arrangement described the three noise signals X, U and Y, although possessing identical statistical characteristics, are uncorrelated.

In FIG. 1, the output S+U from microphone 13 is passed through an inverter 19 the output of which is thus −S−U, and this output is applied as one input to an adder 23. The other input to adder 23 is the output from microphone 11, i.e., the signal S+X. Thus the output from adder 23 is X−U.

Similarly, the output S+Y from microphone 15 is applied to an inverter 21, the output of which is thus −S −Y, and this output is applied as one input to an adder 25. The other input to adder 25 is the output from microphone 11, i.e., the signal S+X. Thus the output from adder 25 is X−Y.

The outputs from the two adders are applied respectively as first and second inputs to a discriminator 27. This discriminator is one of two discriminators described and claimed in my Canadian patent application No. 115,982.

The discriminator used in a circuit which obeys the following two rules:

(i) when input signals 1 and 2 are both of the same polarity, the circuit selects the input closer to zero and presents it at the output;

(ii) when the input signals are of opposite polarity, the circuit presents zero at the output.

FIGS. 2, 3 and 4 shown this effect pictorially: In FIG. 2, the two inputs 1 and 2 are equal and in phase: since they are never of opposite polarity, rule (ii) does not apply, and the output is identically similar to each input.

In FIG. 3, the two inputs 1 and 2 are equal but input 2 lags input 1 by 90 degrees: during period 0 to 90 degrees of input 1, since the two input are of opposite polarity, the output is zero: from 90 degrees to about 135 degrees, input 1 is larger than input 2, so that the output follows input 2; from about 135 degrees to 180 degrees, input 1 is smaller than input 2, and therefore the output follows input 1: from 180 degrees to 270 degrees, the two inputs are of opposite polarity, and therefore the output is zero; from 270 degrees to about 315 degrees, input 1 is larger than input 2, and the output follows input 2, so that the output follows input 1.

In FIG. 4, where input 2 lags input 1 by 180 degrees, as all times (except the crossover points) input 1 and input 2 are of opposite polarity, so that the output remains at zero.

It will be seen that the change in the output from the discriminator is from maximum to zero over a phase difference in the inputs of zero to 180 degrees.

Figure 5:
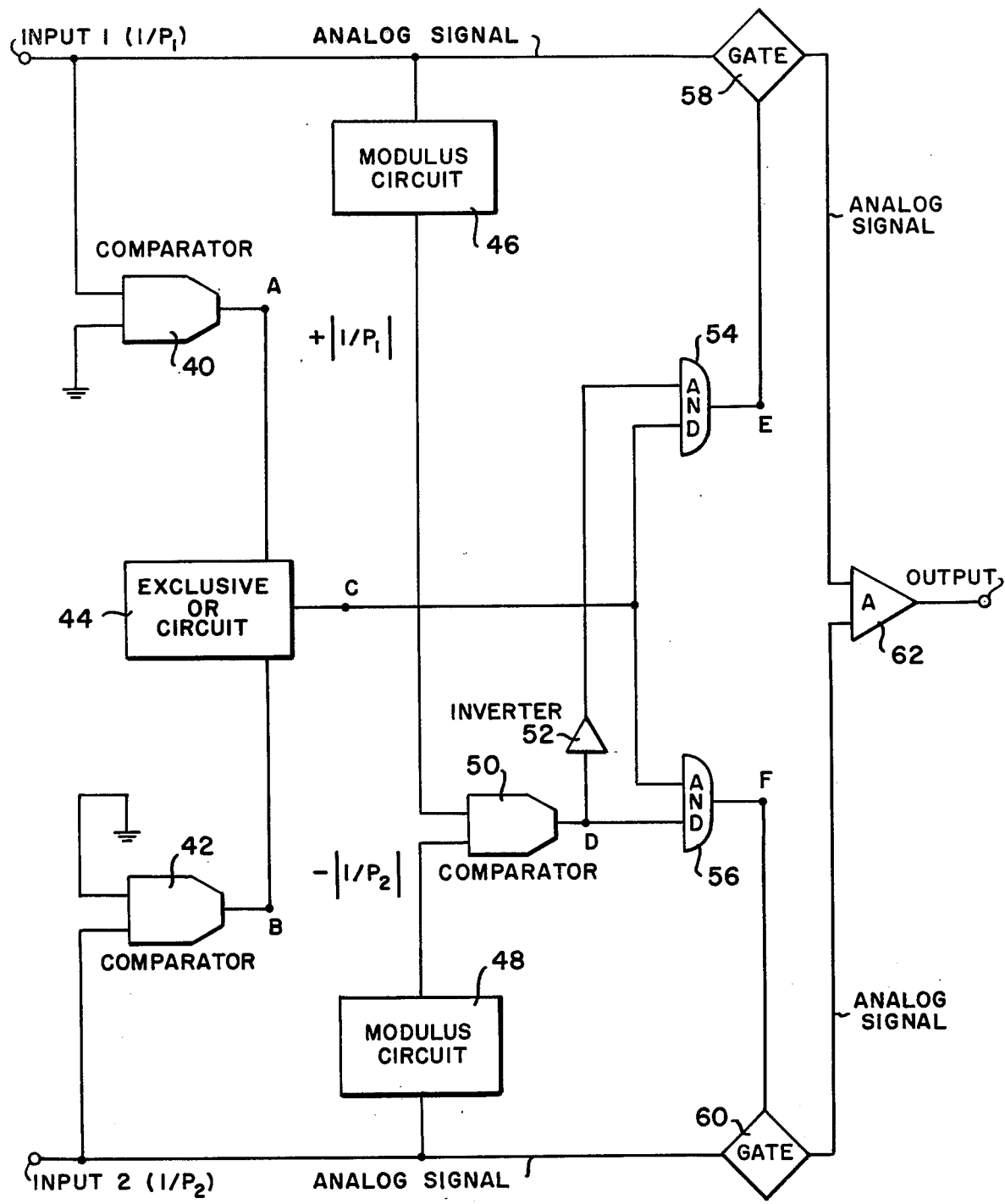
FIG. 5 is a block diagram of one embodiment of the discriminator of FIG. 1.
Figure 6:
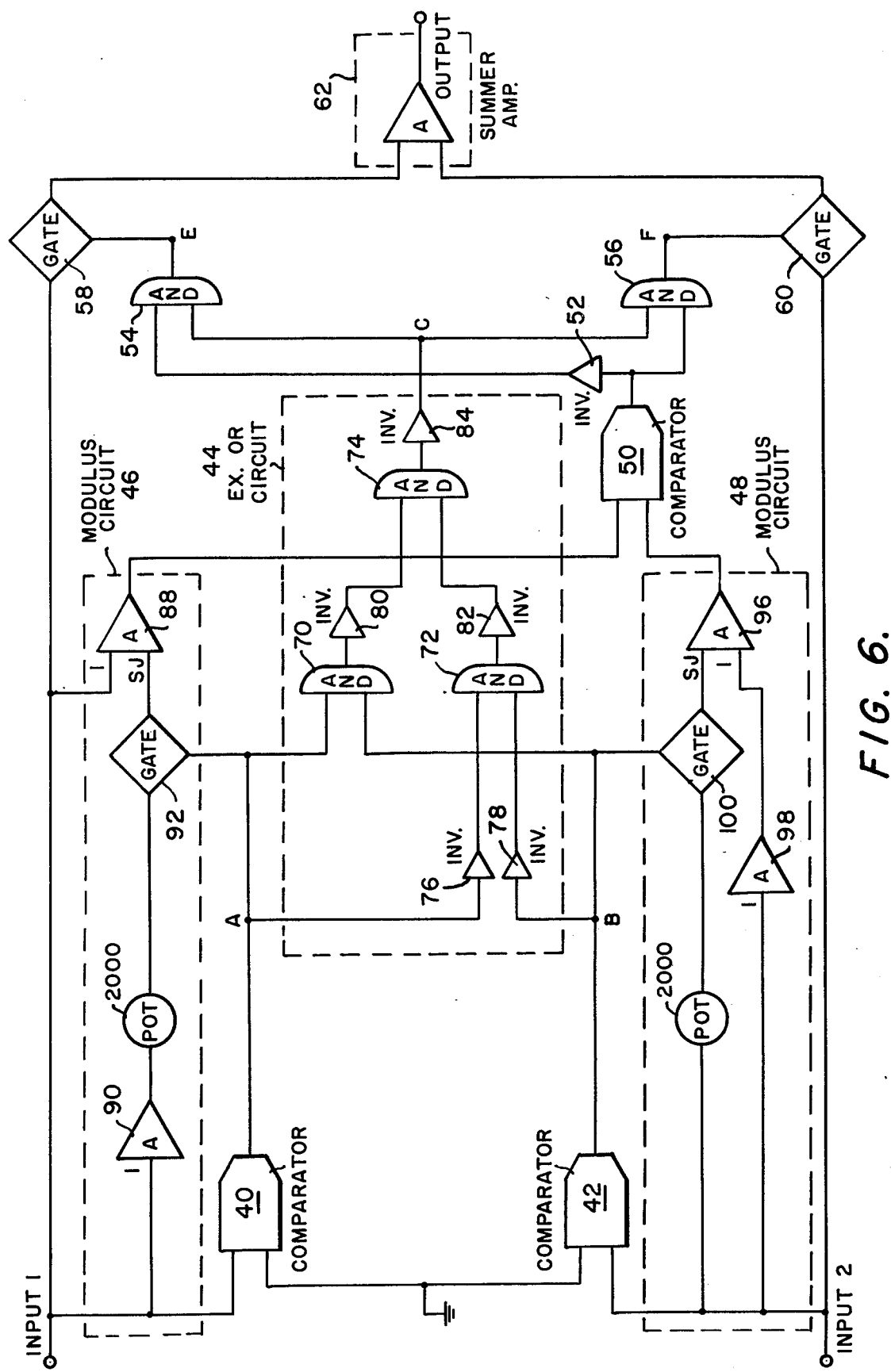
FIG. 6 is a more detailed circuit diagram of the discriminator of FIG. 5.

FIG. 5 shows in block diagram form one form of the discriminator 27 of FIG. 1, and FIG. 6 shows the complete circuit diagram for this embodiment. The blocks shown in FIG. 5 are all well known and commercially available logic circuit components. Thus each of the comparators 40, 42 and 50 is a form of analog-to-digital coverter. It receives two analog inputs, and compares them with one another. If the algebraic sum of the two analog inputs is positive, then the logic output is HIGH (i.e. 1). If the algebraic sum of the two analog inputs is zero or negative, then the logic out is LOW (0). Thus the output is binary in nature, and will always be either "1" or "0". Each of the two modulus circuits 46 and 48 is in effect a full wave rectifier circuit without any smoothing, so that the shape of both positive and negative parts of the parts of the output waveform are similar to those of the input waveform, but the negative parts of the waveform are rendered as positive parts. Each GATE 58 and 60 acts as a high-speed relay which controls the passage of an analog signal according to the binary logic level applied to its driving input. As usual, each gate is a transistor switching circuit, rather than an electromagnetic relay.

The AND gates 54 and 56 each provide a "0" output unless both of their inputs carry a "1" input. The "exclusive OR" circuit 44 has two inputs, and provides a "0" output except when both of its inputs have the same input signal, i.e., when both are "1" or when both are "0". When the inputs are the same, the output is a "1". The inverter 52 provides as its output a binary signal opposite to its input binary signal, i.e., a "1" input signal produces a "0" output signal and a "0" input signal produces a "1" output signal. The amplifier 62 is an operational amplifier used as a summing amplifier.

In FIG. 5, several points on the diagram are denoted by the various letters A through F, and the following "Truth Table" indicates the signals at these various points for varying inputs 1 and 2.

| Case | Input Polarity I/P$_1$ | I/P$_2$ | Amplitudes (inputs) | A | B | C | D | E | F | Output |
|---|---|---|---|---|---|---|---|---|---|---|
| 1 | + | + | $|I/P_1| > |I/P_2|$ | 1 | 1 | 1 | 1 | 0 | 1 | I/P$_2$ |
| 2 | + | + | $|I/P_2| > |I/P_1|$ | 1 | 1 | 1 | 0 | 1 | 0 | I/P$_1$ |
| 3 | + | − | $|I/P_1| > I/P_2|$ | 1 | 0 | 0 | 1 | 0 | 0 | 0 |
| 4 | + | − | $|I/P_2| > |I/P_1|$ | 1 | 0 | 0 | 0 | 0 | 0 | 0 |
| 5 | − | + | $|I/P_1| > |I/P_2|$ | 0 | 1 | 0 | 1 | 0 | 0 | 0 |
| 6 | − | + | $|I/P_2| > |I/P_1|$ | 0 | 1 | 0 | 0 | 0 | 0 | 0 |
| 7 | − | − | $|I/P_1| > |I/P_2$ | 0 | 0 | 1 | 1 | 0 | 1 | I/P$_2$ |
| 8 | − | − | $|I/P_2| > |I/P_1|$ | 0 | 0 | 1 | 0 | 1 | 0 | I/P$_1$ |
| 9 | + | + | $|I/P_2| = |I/P_1|$ | 1 | 1 | 1 | 1 | 0 | 1 | I/P$_2$ |
|   | − | − | $|I/P_2| = |I/P_1|$ | 0 | 0 | 1 | 1 | 0 | 1 | I/P$_2$ |

In practice, the input 1 may not have exactly the same amplitude as the input 2, but the modification of the output by practical differences in these inputs are small, and for simplicity it will be assumed that the amplitudes are the same.

In operation, the comparator 40 will provide a digital signal at A which will be "1" while input 1 is positive, and will otherwise be "0". Comparator 42 will provide a similar output at B depending upon the polarity of input 2. The Exclusive OR circuit 44 will then provide at C a binary signal which will be "1" when both inputs 1 and 2 are positive, or negative, and a signal "0" when the inputs are of opposite sign. As long as the signal at C is "0", neither of the AND gates 54 and 56 will be enabled, so that both gates 58 and 60 will be non-conducting, so that the output applied to amplifier 62 will be zero and the output from the whole circuit will be zero.

When the signal at C is "1", then for each of the AND gates 54 and 56 one input is provided.

The comparator 50 receives at all times a full-wave rectified but unsmoothed version of the input 1 as a first input, and a full-wave rectified but unsmoothed version of the input 2 as a second input. If the instantaneous numerical value of input 1 is greater than the instantaneous numerical value of input 2, then the output of comparator 50, i.e. at the point D, is "1". On the other hand, if the opposite is true, the signal at point D is "0". The signal at D is applied directly as the second input to AND gate 56 while an inversion of the signal is applied directly as the signal to AND gate 54. Thus if signal input 1 is greater than signal input 2 (and they are of the same polarity) at point F appears a signal "1" so that gate 60 is enabled and the analog signal on input 2 is applied to the amplifier 62. On the other hand, if signal input 2 is greater than input signal 1 (and they are of the same polarity) at point E appears a "1" signal and gate 58 is enabled so that the analog signal input 1 is applied to the amplifier 60.

It will be seen that the smaller of the two input signals is applied to the amplifier 62 as long as the signals are of the same polarity. In the case of FIG. 2, when the two signals are equal and of the same polarity, the output is input 2. This result is necessary to avoid the occurrence of zero output when the sound locator is precisely directed at the target, and is achieved by setting comparator 50 to give a "1" output when its input 1 is equal to input 2.

Referring now to FIG. 6, it will be seen that the Exclusive Or circuit 44 includes three AND gates 70, 72 and 74 and five inverters 76, 78, 80, 82 and 84. The modulus circuit 46 makes use of an operational amplifier 88 used as a differential amplifier to the non-inverting input of which is applied input 1, the inverting input being supplied with the same signal which however is inverted in an amplifier 90 and then gated by gate 92 which is driven by the output on lead A. Modulus circuit 48 includes differential operational amplifier 96 inverting amplifier 98 and gate 100.

Returning now to FIG. 1, it will be appreciated that only "noise" is processed through the discriminator 27. The output from the discriminator is passed through a further inverter 29 the output of which is applied as one of the two inputs to an adder 31. The output from microphone 11 is applied directly to the second input of adder 31. The output from adder 31 is applied to a band-pass filter 33, the pass-band of which is centered on the frequency of desired signals, and the output from that filter is the useful output which is monitored to ascertain the presence of signal S.

Certain assumptions are made regarding the operation of the system shown in FIG. 1, and naturally circuit components and values are selected which will make these assumptions tenable. Thus the signal component S is assumed to have the same phase and amplitude in all three inputs. This will be true as long as the wavefront of the incoming sound wave is substantially parallel to the line 17, and as long as the three microphones have equal responses. Small deviations from parallelism will have little effect since the phase difference varies inversely as the wavelength of the sound signal S; and as regards amplitudes, microphones can be suitably matched. Further, the noises are assumed to have the same RMS amplitude at each input, but to be mutually incoherent, i.e., on the assumption that the "noise" comes from a different bearing than that of the target, "noise" signals X, U and Y will have equal RM amplitudes but will have different phases. Since the signal is processed linearly in the adder 31 and the filter 33, and since the noises are fixed in RMS amplitude, the output signal-to-noise gain will not vary with input signal-to-noise ratio. This "noise" is then inverted and added to signal S+X in adder 31. The resultant complex waveform is then filtered in filter 33.

Figure 7:
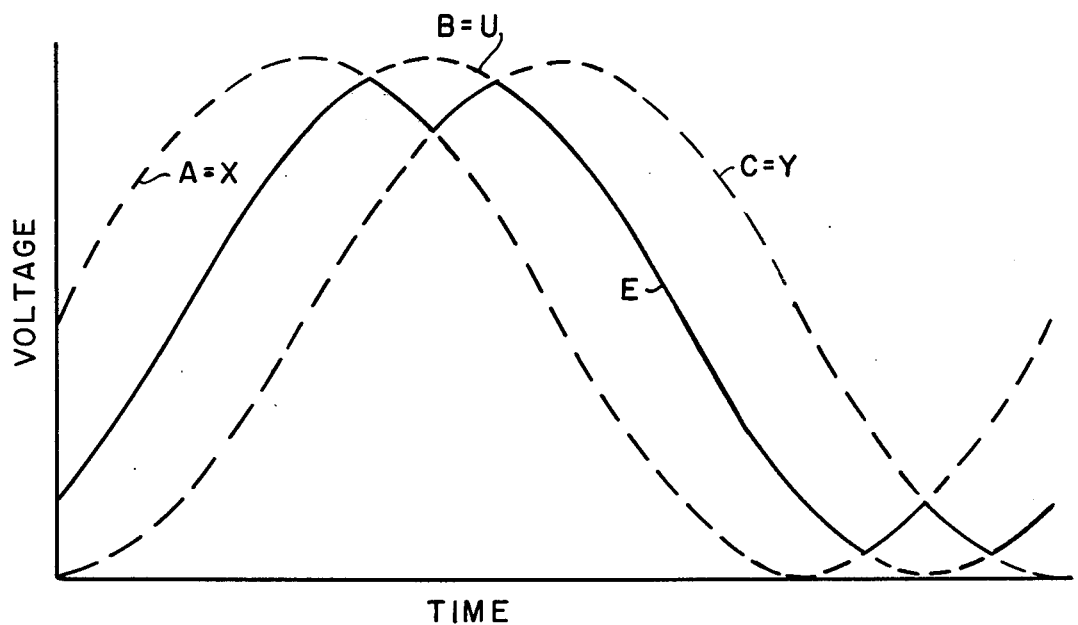
FIG. 7 is a graphical representation of the manner in which the discriminator of FIG. 1 combines three noise inputs.

FIG. 7 shows the three original "noise" inputs at A, B and C in FIG. 1 and the resultant "noise" output at E in FIG. 1. The effect of "adding" an inversion of the selected "noise" signal is partly to cancel noise signal "X" from the signal passing to filter 33.

One of the problems in the processing of signals is that the amplitude statistics at the output tend to be decidely nongaussian, but tests show that with the arrangement of FIG. 1 the output amplitude statistics for noise are very close to gaussian so that measured RMS gains in signal-to-noise ratio are not degraded in the detection process. The measured RMS gains depend on input bandwidth, the number of inputs, and the nature of the processed signal, as the table below indicates.

| SIGNAL | Octave Band | 1% Bandwidth | No. of Inputs |
| --- | --- | --- | --- |
| Sinewave | 4.6 db | 6.2 db | 3 |
| Noise (at stated bandwidth) | 4.1 | 5.7 | 3 |
| Sinewave | 5.5 | 7.2 | 4 |
| Noise (at stated bandwidth) | 5.0 | 6.7 | 4 |
| Sinewave | 7.3 | 8.6 | 6 |
| Noise (at stated bandwidth) | 6.8 | 8.1 | 6 |

Figure 8:
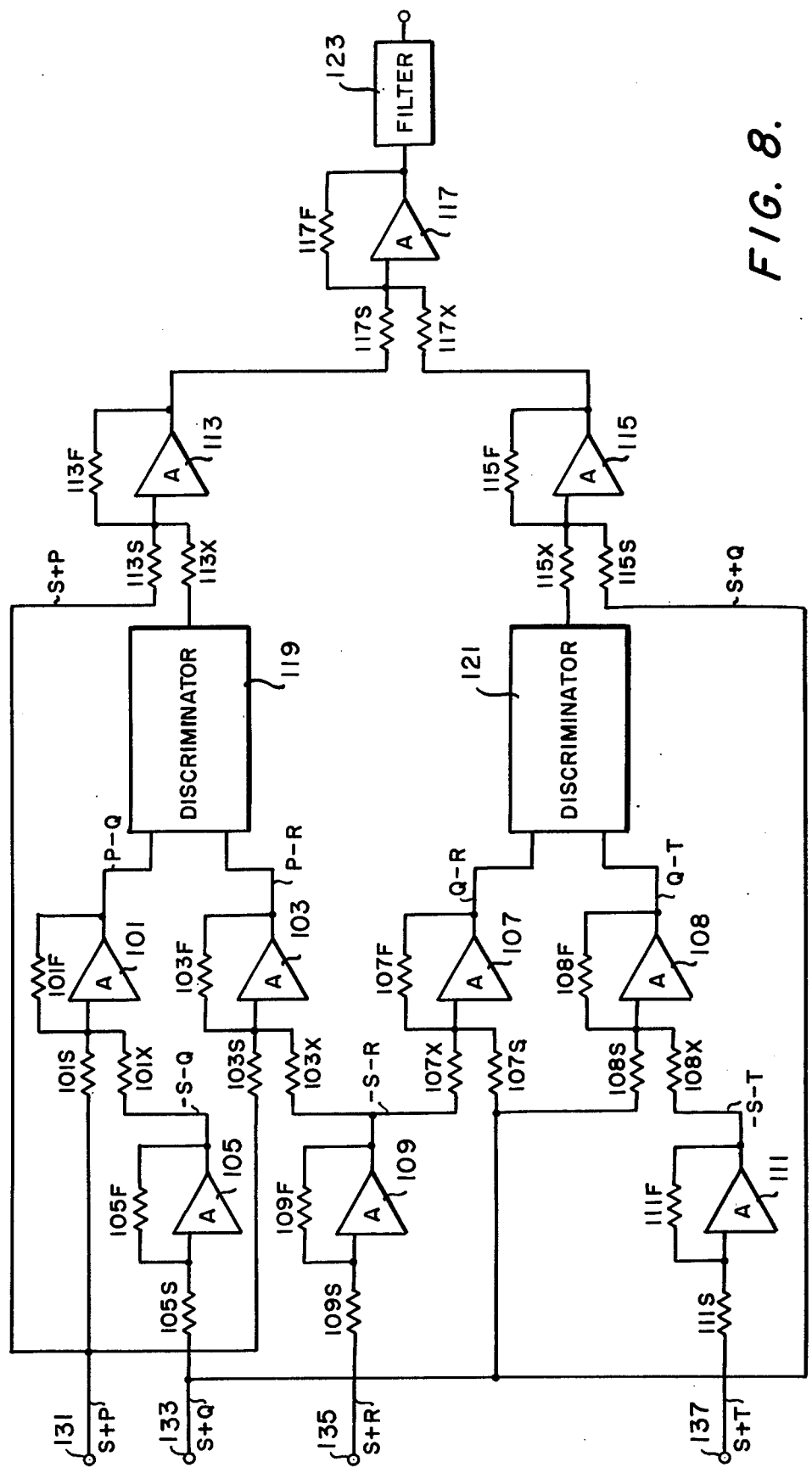
FIG. 8 is a circuit diagram of a second embodiment of the invention in which four input signals are utilized.

As indicated by the above table, the arrangement of FIG. 1 can be modified to accept 4 input or 6 inputs from a corresponding number of microphones. FIG. 8 is a diagrammatic representation of a detection circuit having four inputs 131, 133, 135 and 137 derived respectively from four microphones arranged on a common line in the manner indicated in FIG. 1 for the three microphone arrangement. The input 131 is applied to first and second operational amplifiers AMP. 101 and AMP. 103. The input 133 is applied to first, second and third operational amplifiers 105, 107 and 108. The input 135 is applied to a single operational amplifier 109. The input 137 is applied to a single operation amplifier 111. In FIG. 8, each amplifier shown has associated with it, for these inputs, a series input resistor indicated by XXX.S (where XXX is the number of the amplifier) and a feedback resistor XXX.F (where XXX is the number of the amplifier).

Amplifier 105 serves merely as no-loss inverter and its output is applied through a series resistor 101X to amplifier 101. The amplifier 101 serves as an adder and receives signal S+P (where S is the desired signal and P is the noise) from input 131 and the inverted signal −S −Q (where Q is the noise on input 133) and its output P −Q is applied to one input of a discriminator 119.

Amplifier 109 serves merely as a no-loss inverter and its output is applied through a first series resistor 103X to amplifier 103 and through a second series resistor 107X to amplifier 107. The input 135 consists of the signal S and noise "R", and the output from amplifier 109 is thus −S −R. Amplifier 103 acts as an adder, and its output is thus P−R. This is applied to discriminator 119 Amplifier 107 also acts as an adder, and its output is thus Q−R, and this is applied to a discriminator 121. Amplifier 111 serves as a no-loss inverter of the signal S+T (T is the noise) from input 137 and its output −S−T is applied through series resistor 108X to amplifier 108. Amplifier 108 acts as an adder, and its output is thus Q−T, and this is applied to the discriminator 121.

Each of the discriminators 119 and 121 operates in the manner described above in connection with discriminator 27 of FIG. 1. The output from discriminator 119 is applied through a series resistor 113X to an operational amplifier 113, and the input 131 is also applied to this amplifier through a series resistor 113S. The output from discriminator 121 is applied through a series resistor 115X to an operation amplifier 115, and the input 133 is applied through a series resistor 115S to this amplifier.

Each of the amplifiers 113 and 115 acts as an adder, and their outputs are applied respectively through series resistors 117S and 117X to an operational amplifier 117. The output from that amplifier is passed through a band-pass filter 123 to provide the useful output from the circuit.

In the circuit of FIG. 8, all the operational amplifiers are integrated circuits sold under the type number AMELCO 809 CE, and all the resistors shown have a resistance of 100,000 ohms.

The manner of operation of the circuit of FIG. 8 will be seen to be similar to that of the circuit of FIG. 1. First, pairs of inputs are combined to eliminate the target signal S, and then the "noise" difference signals are applied in pairs to discriminators.

Figure 9:
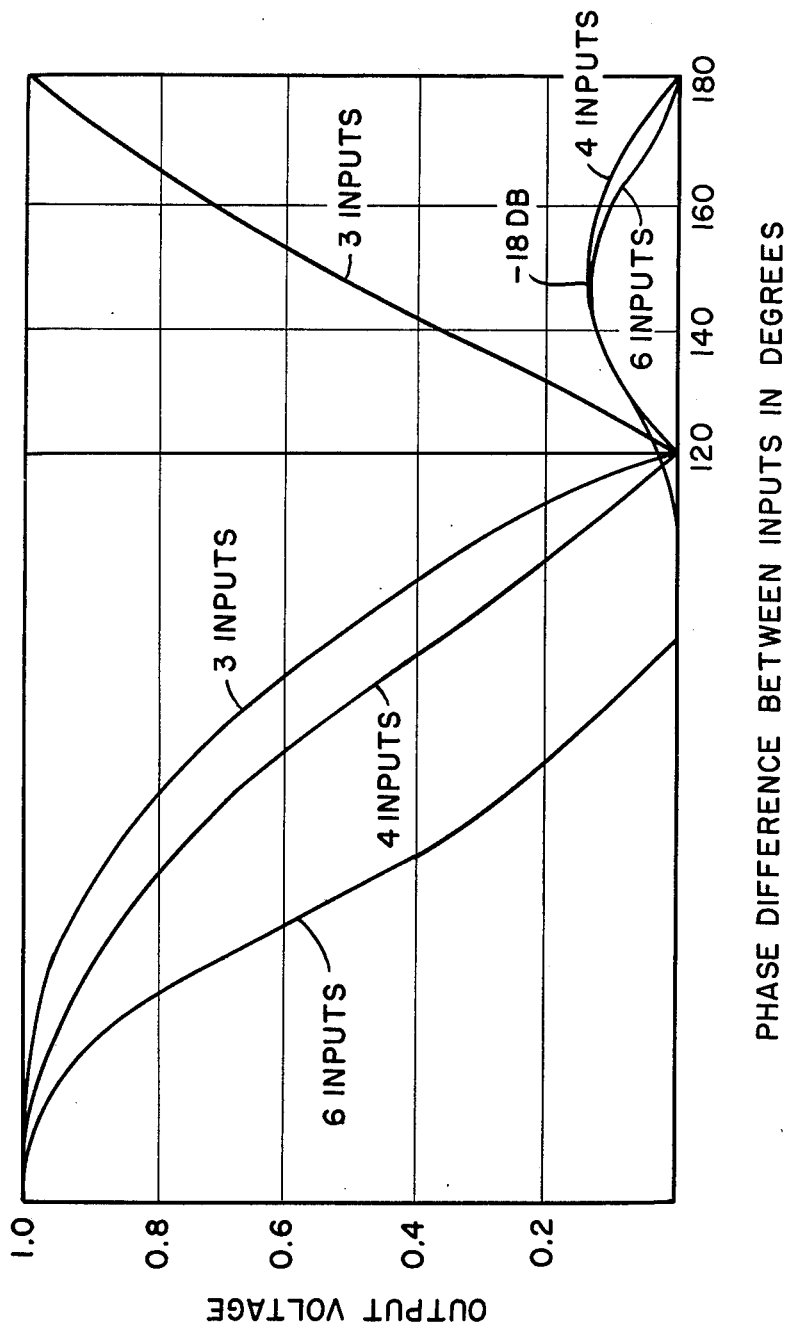
FIG. 9 is a graphical representation illustrating the beam-forming properties of 3-input, 4-input and 6-input arrangements according to the present invention.

However, although the three input system of FIG. 1 is effective for target detection, the four-input system of FIG. 8 is required for beam forming, since the phase response curve for the three-input system of FIG. 1 is at maximum at 180 degrees relative phase difference between the three inputs. Referring to FIG. 1, when the line 7 is mis-oriented so that the incoming wavefront is not parallel to the line, then there will be a phase-difference between the signals arriving from a target at the various microphones. The phase difference will depend upon the angle by which line 7 is mis-oriented, and the distance between the microphones in terms of wavelengths of the sound from the target. As far as the circuits of FIGS. 1 and 8 are concerned, it is the phase difference between the various inputs which is critical, and the curves in FIG. 9 show how the output, expressed as voltage for 3-input systems according to FIG. 1, for 4-input systems according to FIG. 8, and a 6-input system using the same method of detection, vary with the phase difference between the inputs. It will be clear to those skilled in the art that from the curves of FIG. 9 it is possible to draw beam patterns for the three devices concerned. It can be shown that all three devices produce wider beams than would be produced by a simple additive arrangment of the same number of inputs. On the other hand, the side lobes produced are smaller than with such additive arrays. Such an arrangement provides a wide beam useful for the initial detection of a target.

It has been found that the arrangements described are particularly efficient when dealing with sinewave-like signals processed in a narrow band, when the gain obtained is compared with that given by additive processing (on an equal-beam-width basis). In a multi-microphone arrangement it is found that a slightly larger number of microphones is needed to produce a given beam width, compared with an additive system.

In an experimental array according to FIG. 8, band widths of 41 degrees with side lobes 15 and 19 dB down have been achieved.

Figure 10:
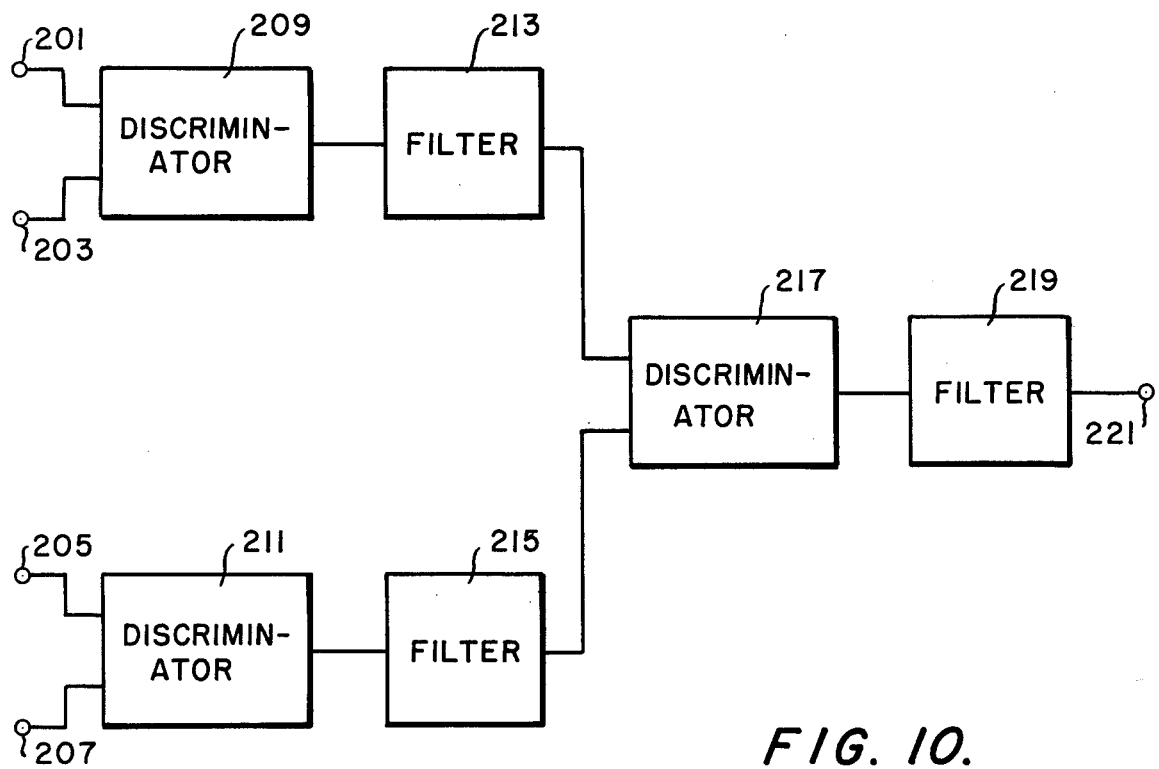
FIG. 10 is a diagram showing how discriminators of FIG. 8 can be utilized in a direction finding, rather than a signal detection, role.

FIG. 10 illustrates an arrangement in which four microphones 201, 203, 205 and 207 are grouped in pairs, the outputs of the first pair of microphones being fed to a discriminator 209 and the outputs of the second pair of microphones being fed to a discriminator 211. The output from discriminator 209 is passed through a band-pass filter 213 whose pass band is centered on the frequency of the target signal, and the output of discriminator 211 is passed through a similar bandpass filter 215. The outputs from the two filters are combined in a further discriminator 217, the output of which is passed through a third similar band-pass filter 219 to an output terminal 221. In this circuit, the discriminators are of the type described above and shown in the earlier drawings. This circuit is also shown and described in my Canadian application No. 115,982, and that arrangement produces a narrow beam having a 10 degree beam width and with side lobes which are 25 dB down. It provides a very useful arrangement for direction-finding, as distinct from target detection.

The four inputs 131, 133, 135 and 137 of FIG. 8 can be used simultaneously as the four input microphones 201, 203, 205 and 207 of FIG. 10. The circuit of FIG. 8 is then used to effect early detection of the target, and once the presence of a target has been established, the circuit of FIG. 10 can be used to obtain an accurate bearing reading on the target.

If desired, switching can be provided so that two of the discriminators and the filter of FIG. 10 can be utilized in the circuit of FIG. 8, in which case the circuit of FIG. 8 is used to detect the target, and then the circuit of FIG. 10 is established to locate the target.

The three-input discriminator arrangement of FIG. 1 and the 4- and 6-input modifications described in connection with FIG. 8 provide arrangements in which the signal-to-noise gain is independent of input-signal-to-noise ratio; the output amplitude statistics are essentially gaussian; and the signal to noise gain is superior to that of an adder for equal beam widths for sinewave signals processed in narrow band where the noise background is random or flow noise.

Of course, distant in-beam noise is processed as if it is a part of the useful signal S, and for that type of noise the performance is very much like that of a simple additive array. As in an additive array, in-beam noise which differs considerably in frequency from the target frequency can be reduced considerably by use of the various band-pass filters.

As mentioned above, in the case of the 4 microphone array both the "detection" mode and the "direction finding" mode can be used, either simultaneously, or sequentially by suitable switching. Thus the 41 degree beam is used to detect the target, and then the target bearing is ascertained using the alternative mode with its narrow pointed beam. For this number (4) of microphones, the signal-to-noise gains for both modes are about the same. Larger arrays using the "detection" mode can be built. Thus 13 microphones designated 601 thru 613 can be arranged with microphones 601 through 604 connected to a first 4-input discriminator (e.g. FIG. 8) with microphones 604 through 607 connected to a second discriminator; with microphones 607 through 610 connected to a third discriminator; and with microphones 610 through 613 connected to a fourth discriminator. The outputs of the discriminators can be passed through suitable band pass filters, and the four outputs combined in a further discriminator. The output from this last discriminator, after passing through a band pass filter, serves as the useful output from the circuit. In large sizes, arrays of this type can be appreciably superior to additive arrays especially for small input bandwidths.

One useful feature of the apparatus described is its ability to operate properly in a windy environment, in which there is much wind-induced noise to contend with.

Non-acoustic system applications can include ECM and radio monitoring, and low frequency radar.

It has been found that, in the absence of any bandpass filters, the noise output bandwidth is appreciably greater than the noise input band-width. It follows that if a final bandwidth filter has the same bandwidth as an input bandwidth filter, since the noise frequencies have been band spread in the non-linear processing, that the final bandpass filter provides a distinct gain in signal-to-noise ratio.

The signal processing circuit or discriminator which has been described above also finds application in the filtering of noise from a single input signal.

Linear filtering is an extremely common operation in electronic systems, and the basic idea of limiting the bandwidth of a system so as to include the signal and exclude unwanted wide band noise has proven extremely valuable.

An observed phenomena in the output spectrum levels of the three-input discriminator device provides the key to a superior type of filtering in which not only is the bandwidth limited in the normal way but noise within the desired output bandwidth is reduced with respect to a signal. Signal here refers to a sine wave having a relatively narrow bandwidth, that is of long duration, whose frequency and amplitude remain essentially constant. Real signals may have slight frequency and amplitude variations. However, the signal bandwidth is assumed to be small compared with the bandwidths of the noise within the output bandwidth of the filter being considered. The signal characteristics will set the ultimate limit to the bandwidth of this proposed type of filter just as they do in the linear type of filter.

As previously discussed, the output spectra of the 3 and 4-input discriminators effectively bandspread the noise whereas the linearly processed signal was not bandspread. It was also shown that this effect became proportionately much greater in narrow bandwidths. The basic mechanism is related to the rate of change of amplitude and originates in the non-linear discriminating process itself. Finally, it was shown that the 3-input device proved to be highly efficient especially in narrow bands where efficiency is defined by signal to noise gain for a given beamwidth in array processing.

These characteristics and the following expression show that the linear-non-linear processing has a useful application in filtering. The autocorrelation function $R_x(t)$ is given by:

$$R_x(t) = \frac{N}{\pi T} (\sin W_2 T - \sin W_1 T)$$

where:
$W_1 = 2\pi f_1$, $f_1$ is the lower frequency limit in the band
$W_2 = 2\pi f_2$, $f_2$ is the upper frequency limit in the band $$N = \frac{\pi R_x(o)}{W_2 - W_1} = \frac{\pi}{W_2 - W_1}$$

T = delay time

A solution for this equation shows that for a value of T equal to the period of one hertz at $f_o$, the auto-correlation function is near zero for a bandwidth equal to the center frequency. That is the auto-correlation coefficient of a noise whose bandwidth is somewhat greater than a octave band (i.e. BW = $f_o$) will be near zero when comparing the input and the output of a delay line of length T, the period of 1 hertz at $f_o$. This means that two delay lines of equal length connected in series will provide the required three input for a three-input processor. Assuming the proper relationship between bandwidth and delay nT, the noises at all three inputs will be uncorrelated.

Figure 11:
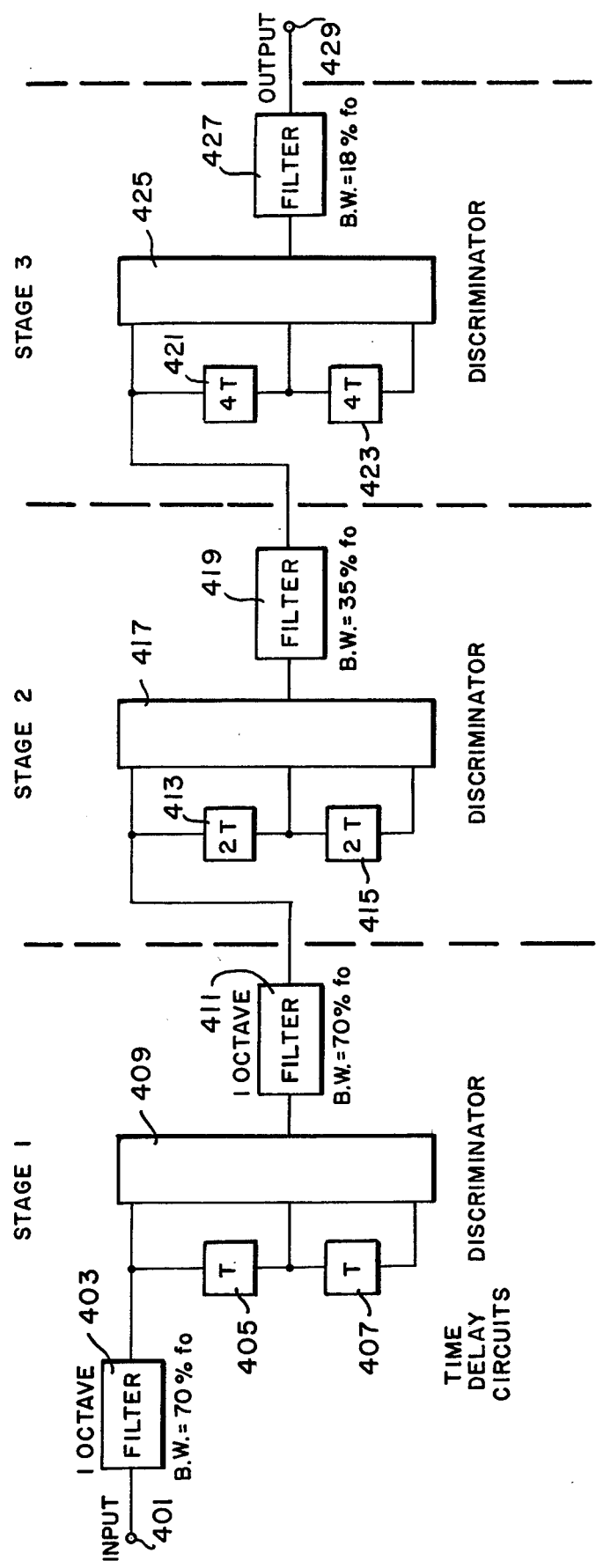
FIG. 11 is a block diagram of a multistage filter utilizing a discriminator circuit shown in FIG. 1.

Referring now to FIG. 11, this is a block diagram showing the use of the three-input discriminator in three basically similar stages of a filter. An input terminal 401 is arranged to receive the noise-containing signal to be processed, and is connected to an orthodox band-pass filter 403 with a one-octave bandwidth approximately equal to 70% $f_o$. The output of this filter is applied to two series-connected delay lines 405 and 407 to provide three inputs as shown to a discriminator circuit 409. Each delay line produces a delay time T equal to the period of one cycle at the center frequency, and the discriminator is the three input arrangement of inverters, adders and discriminator shown in FIG. 1. The output from the discriminator circuit is applied to a further filter 411 having a bandwidth approximately equal to the bandwidth of the input noise to this stage of the circuit, i.e. approximately 70% $f_o$. The output from filter 411 is applied in a similar manner as the input to stage 2, being applied to two series connected delay lines 413 and 415 each producing a delay time 2T (i.e. equal to twice the delay time T) and so providing the three inputs shown to a further discriminator circuit 417. An output filter 419 with a band width of only 35% $f_o$ is connected between circuit 417 and two series connected delay lines 421 and 423 each producing a time delay of 4T (i.e. equal to four times the delay time T). This arrangement provides three inputs for discriminator circuit 425, the output of which is connected through an output filter 427 having a bandwidth of only 18% $f_o$ to an output terminal 429.

It will be seen that a one octave bandwidth is used at the input with unit T rather than the calculated 100% $f_o$ bandwidth. The reason for this is the phase response characteristic of the three-input device, which peaks at 180° phase difference. By limiting the noise bandwidth to one octave for this value of T, this peak of the phase response curve cannot occur, but as the above formula shows the auto-correlation function is now greater than zero.

The effective filtering per stage can be calculated from the phase response curve for the three-input device and extensive measurements with a swept sine wave at the input confirm the calculations. However, these apparent bandwidths cannot be used in calculating the signal-to-noise gain of each stage because of the bandspreading effect of the non-linear processing of noise. It was found that the filter mode arrangement of FIG. 11 yields the best result. Great care must be used in measuring the input and output noise spectra, together with the RMS change involved, to determine the correct gain per stage. A measurement of the auto-correlation function of the noise at the output of a linear-non-linear filter stage checked with the measured noise bandwidth. In addition the amplitude distribution was virtually gaussian. There were no measureable differences between the output noise and an equivalent bandwidth of noise after linear filtering. This allows the calculation of multistage performance of a linear-non-linear filter design.

Figure 12:
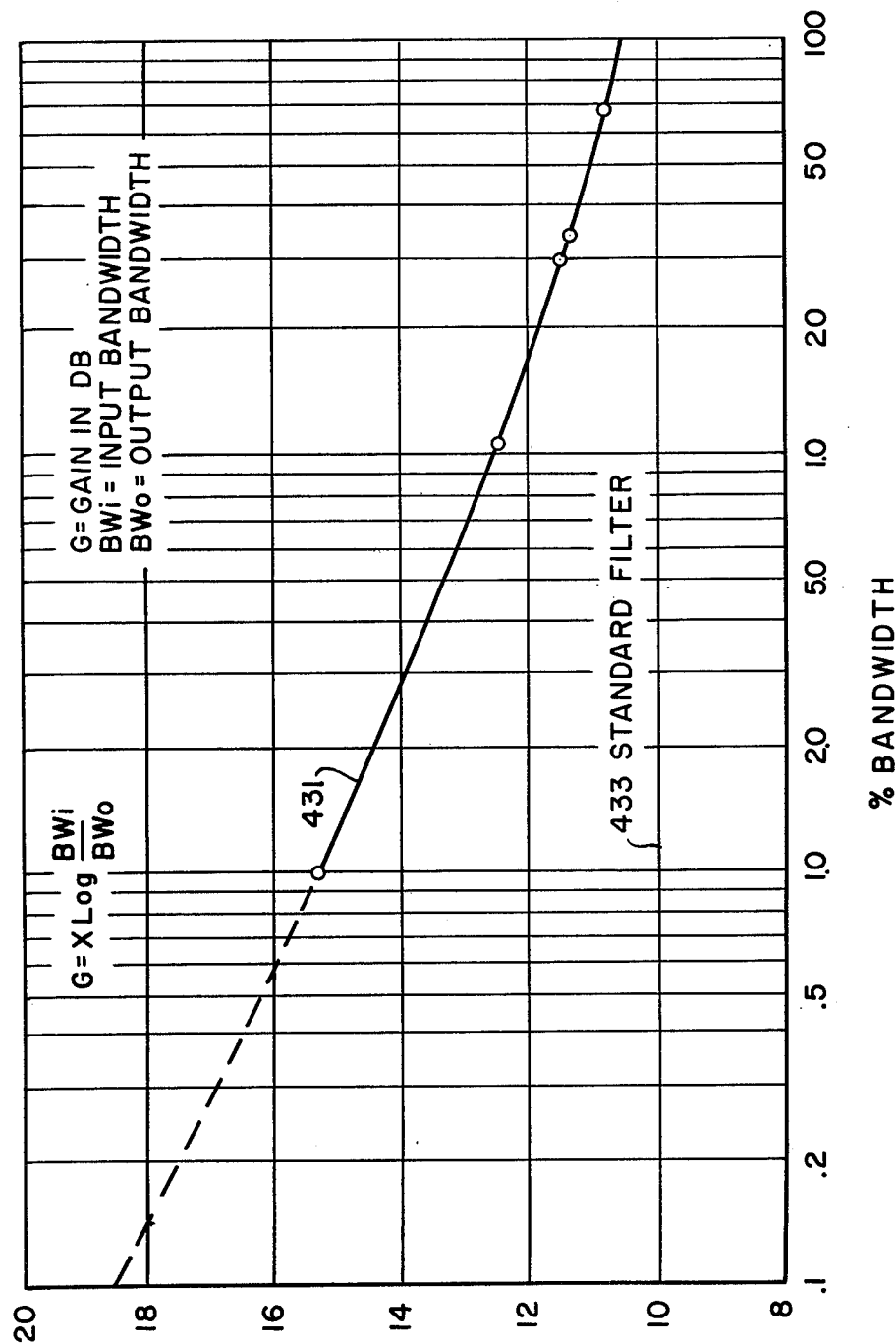
FIG. 12 is a graphical representation of observed gains of the three input discriminator used in the filter mode.

In linear filtering the correct gain is given by G=10 log Bwi/Bwo in dB, where signal gain is assumed to be unity.
where Bw = input noise bandwidth
Bwo = output noise bandwidth
In this linear-non-linear type of filtering the gain per stage was measured directly using the RMS measuring circuits. A value of X was calculated from $$X = \frac{G}{\text{Log}\frac{Bwi}{Bwo}}$$

using measured values of Bwi, Bwo and G, and this value is plotted on FIG. 12 (curve 431) as a function of bandwidth for five different input bandwidths; 70%, 35%, 30%, 11% and 1% of $f_o$. It will be seen that the value of X increases with decreasing bandwidth. For comparison purposes the standard value of X=10 for linear filtering is also shown (curve 433) on FIG. 12.

Clearly there is a measurable gain using linear-non-linear processing when compared to standard filtering. This gain derives partly from the normal out-of-band rejection based on the phase response curves for the 3-input device. It also derives, in part, from the band-spreading of noise from within the pass band of the filter stage itself to outside of the final pass band which the terminal filter elimates. This latter part of the gain is very small at wide bandwidths but becomes increasingly important at narrow bandwidths. Measurements of improvements were easy but unimpressive at octave bandwidths. The gains recorded at 1% bandwidths were difficult to measure but were entirely convincing. A special very narrow band pass measurement filter which could be swept across the output spectra had to be constructed. A linear regenerative delay line filter was used whose band pass was held constant at 0.3% $f_o$.

Figure 13:
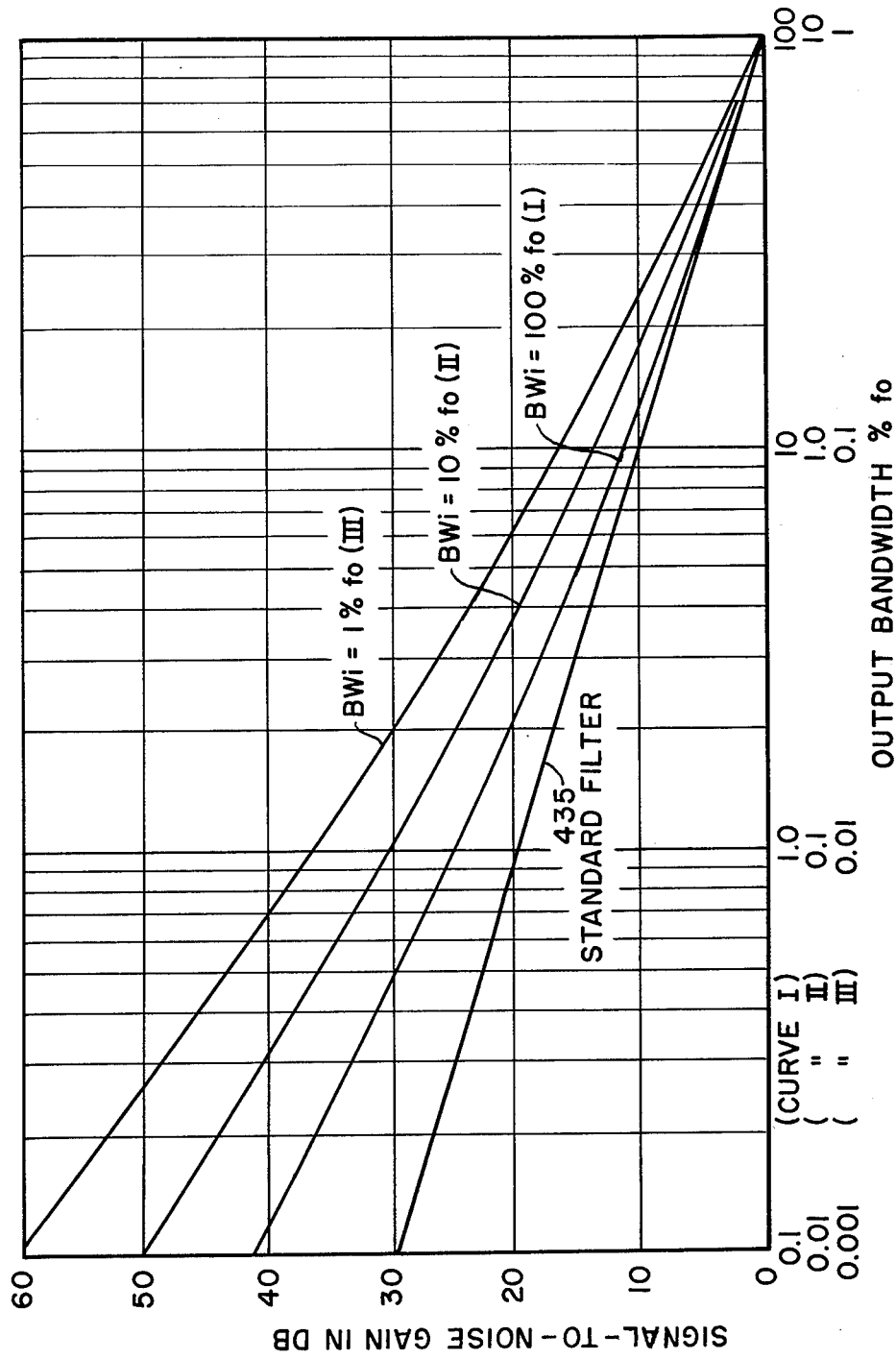
FIG. 13 is a graphical indication of gain for the three input discriminator used in the filter mode.

Using the measured values of X at various bandwidths and the calculated number of stages required to achieve narrow bandwidths, the accumulated gain of this filter as a function of bandwidth is plotted on FIG. 13. The bottom curve 435 is the result of standard linear filtering over the three decades of bandwidth change shown. Curve I shows the result of linear-non-linear filtering and is supported by measurements to the 1% bandwidth point, and is an extrapolation beyond that point. Curves II and III are the results of starting with initially narrower bandwidths and are largely extrapolations of the measured data. Since it is clear that this type of filtering works best in narrow bands, it is always possible to heterodyne wide band low frequency energy into relatively narrow band higher frequency energy for more efficient processing.

Standard linear filtering is one dimensional filtering in that the transfer function is related to frequency only. In the linear-non-linear type of filtering just described, the device is both phase sensitive and amplitude sensitive. As a result, the transfer function involves both frequency or phase differences across a delay line and amplitude differences across the same delay line. The mechanism of noise bandspreading from within the output pass band can and does occur because the noise is not fully correlated across the delay line even within the output pass band. This is a fundamentally different situation from the in-beam distant noise case which arises in spatial processing. Such in-beam noise is almost fully correlated and is processed as signal. For this reason, the gains achievable vis-a-vis the additive processing are limited to sources of noise which are uncorrelated at each microphone. When filtering no such restriction applies as the degree of noise correlation across the delay line is determined by the auto-correlation function or by the relationship of the noise bandwidth and the value of delay involved.

Figure 14:
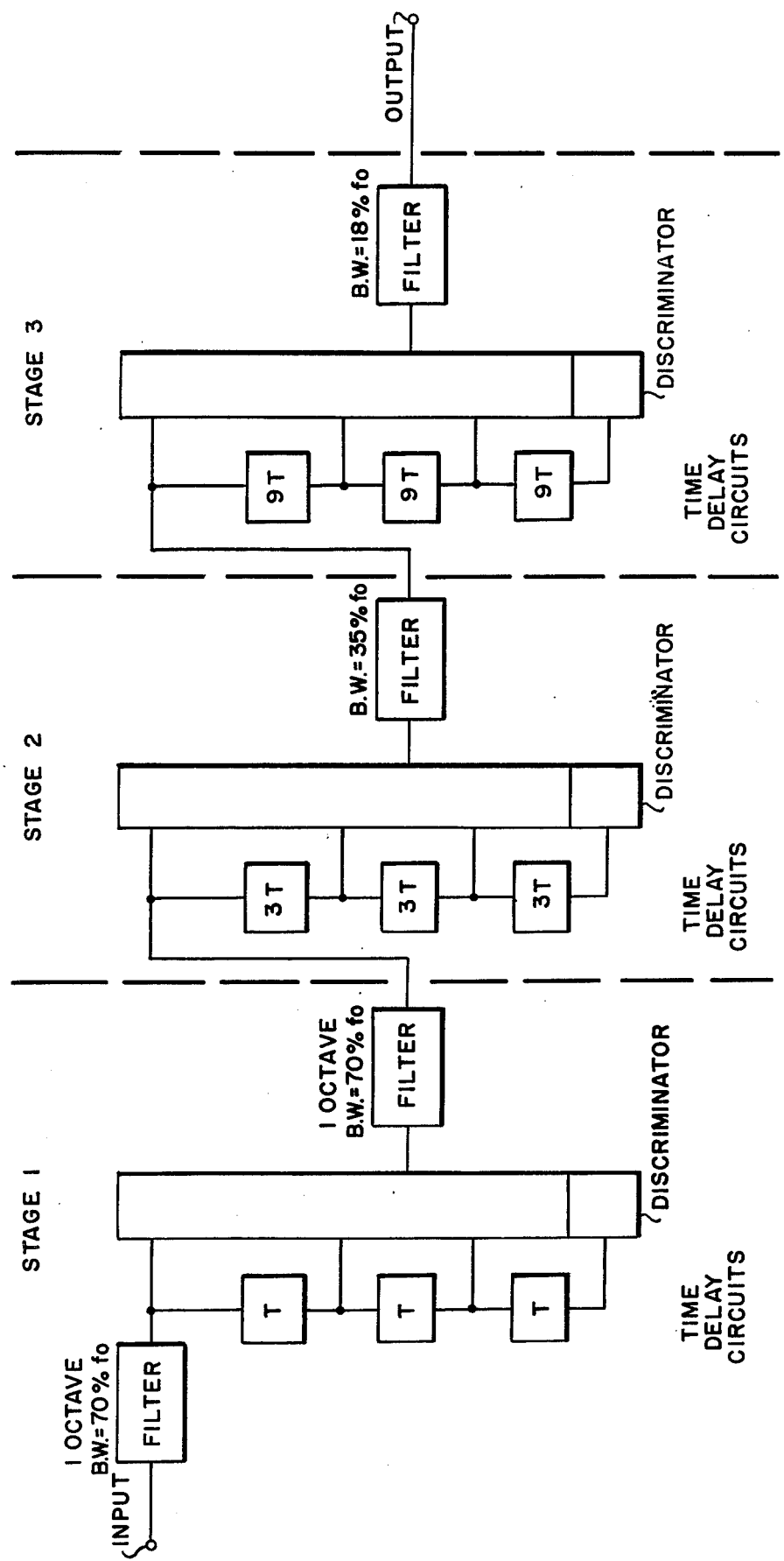
FIG. 14 is a block diagram of a multistage filter a four-input discriminator circuit such as that shown in FIG. 8.

In FIG. 11, the 3-input discriminator is employed. It has the disadvantage of using expensive and, in higher stages, very long delay lines. The terminal filter in each stage has to be carefully set to achieve a proper balance between the apparent gain of a given stage and the correct input bandwidth to the next stage. A 4-input discriminator circuit arrangement such as that shown in FIG. 14 using the circuit of FIG. 8 requires an additional delay line per stage but would be less critical in its terminal filter requirements and would require fewer stages to achieve a narrow band output. Measurements on the 4-input arrangement showed a lower efficiency, i.e. gain in signal-to-noise ratio per unit change in bandwidth, than the 3-input arrangement. The values of T must be increased by a factor of 3 rather than 2 per stage. The lower efficiency was more apparent at wide bandwidths that at narrow bandwidths.

A final point concerns the rise time of this type of filtering. For a multistage linear-non-linear filter the rise time is approximately twice as long as the rise time for a standard linear filter of equal bandwidth. This means that for signals of finite length, any post detector time averaging gain will be 1.5 dB less for the linear-non-linear filter than for the standard filter. This loss is relatively small when compared to potential improvement of 10 to 30 dB.

The phase response for the three-input device or multiples thereof produces wide main beams when used in an array. Side lobes are 18 dB down which is lower than the corresponding additive processing for four-inputs. The wide beam is useful in search and hence this is called the search mode of operation.

The signal-to-noise gain is independent of input signal-to-noise ratio in the 3-input device but depends on the input bandwidth. It is particularly efficient in narrow bands and is superior to the additive array on an equal bandwidth basis. This superiority is restricted to operation against an interelement noise background which is uncorrelated and does not apply to in-beam distant noise.

When used in the filter mode configuration, the three-input discriminator processor bandspreads the noise within the pass band of the filter which noise is subsequently removed. This effect does not occur for narrow band signal which is processed linearly. The result is a high gain, two dimensional filtering process. Measurements indicate large improvements over standard linear filtering. This improvement lies between 10 and 30 dB better than ordinary filtering for a three-decade change in bandwidth.

Obviously, many modifications and variations of the present invention are possible in light of the above teachings. It is therefore to be understood that, within the scope of the appended claims, the invention may be practiced otherwise than as specifically described.

What is claimed is:

1. A signal processing circuit particularly adapted for use in the detection of a selected signal against background noise, comprising:

separate inputs which comprise at least first, second and third inputs which provide respectively the selected signal plus a first noise signal, the selected signal plus a second noise signal, and the selected signal plus a third noise signal, the three noise signals being uncorrelated;

first combining means arranged to produce from the first and second inputs a fourth signal from which the selected signal has been eliminated and which comprises the difference between the first and second noise signals;

second combining means arranged to produce from the second and third inputs a fifth signal from which the selected signal has been eliminated and which comprises the difference between the second and third noise signals;

means arranged to compare the fourth and fifth signals, and when said signals are of the same polarity to select the signal which has an instantaneous value closer to zero, and to present that signal as an instantaneous intermediate output;

means arranged to compare the fourth and fifth signals, and when the two signals are of opposite polarity, to present zero as the said instantaneous intermediate output; and third combining means by which a selected one of the said inputs is combined with the said intermediate output in a manner tending to eliminate the noise component therein, the output of the third combining means containing the selected signal with a higher signal-to-noise ratio than any of the incoming signals.

2. A signal processing circuit as in claim 1, in which the fourth and fifth signals are applied respectively to first and second gates as analog signals, each gate is arranged when enabled to pass the said analog signal on as an output from the detector, and the first and second gates are selectively enabled to provide the specified intermediate output.

3. A signal processing circuit as in claim 2, having first comparator means to ascertain whether the fourth and fifths signals are of different polarity, and when that condition exists, disable both said gates.

4. A signal processing circuit as in claim 2 having comparator means to ascertain which of the fourth and fifth signals has instantaneously the smaller value, said comparator means being arranged to enable the appropriate first or second gate to permit that signal to pass to an output, unless the two signals are of opposite polarity.

5. A signal processing circuit as in claim 2, having comparator means to ascertain whether the fourth and fifth signals are instantaneously equal or whether one is smaller than the other, and are arranged to enable the appropriate first or second gate to permit that smaller signal to pass to the output, unless the two signals are of opposite polarity, and are arranged when the two signals are equal to enable a preselected one of the two gates to permit the associated version to pass to the said output.

6. A signal processing circuit as in claim 3, having comparator means to ascertain whether the fourth and fifth signals are instantaneously equal or whether one is smaller than the other, and are arranged to enable the appropriate first or second gate to permit that smaller signal to pass to the output, unless the two signals are of opposite polarity, and are arranged when the two signals are equal to enable a preselected one of the two gates to permit the associated version to pass to the said output.

7. A signal processing circuit as in claim 1, in which the first and second inputs are combined by passing one of these inputs through a sign-inverting circuit, and then passing the inverted input and the other input through an adding circuit to produce the desired fourth signal; and in which the second and third inputs are combined by passing one of these inputs through a sign-inverting circuit, and then passing the inverted input and the other input through an adding circuit to produce the desired fifth signal.

8. A signal processing circuit as in claim 1, in which the first and second inputs are combined by passing the first input through a sign-inverting circuit, and then passing the inverted input and the second input through an adding circuit to produce the desired fourth signal; and in which the second and third inputs are combined by passing the third input through a sign-inverting circuit, and then passing this inverted input and the second input through an adding circuit to produce the desired fifth signal.

9. A signal processing circuit as in claim 1, in which said intermediate output is inverted and passed through an adding circuit with said selected one of said inputs, whereby the signal-to-noise ratio in the output from the adding circuit is considerably reduced.

10. A signal processing circuit as in claim 1, and in which an output from the third combining means is processed by a band-pass filter to reduce or eliminate noise signals having a frequency appreciably different from a preselected frequency chosen to be a representative of the said selected signal.

11. A signal processing circuit according to claim 1, in which the inputs are obtained from microphones and the selected input signal is an acoustic signal coming from the object whose presence the circuit is required to ascertain.

12. A signal processing circuit particularly adapted for use in the detection of a selected signal against background noise, comprising:

more than three separate inputs each of which provides the selected signal plus a noise signal, the noise signals of the various inputs being uncorrelated;

a plurality of combining means arranged severally to serve different pairs of said inputs and to produce respectively noise difference signals from which the said selected signal is absent;

means for combining different pairs of these noise difference signals in discriminators each of which includes means arranged to compare the pair of signals, and when the signals are of the same polarity to select the noise signal which has an instantaneous value closer to zero, and to present that signal as the instantaneous output, and means arranged to compare the pair of signals, and when the signals are of opposite polarity, to present zero as the instantaneous output; and further combining means by which is selected one of the said inputs is combined with an intermediate output derived from the outputs of the discriminators in such a manner as to tend to eliminate the noise component therein, the final signal containing the selected signal with a higher signal-to-noise ratio than any of the incoming signals.

* * * * *